United States Patent
Zheng et al.

(10) Patent No.: US 11,697,729 B2
(45) Date of Patent: Jul. 11, 2023

(54) MODIFIED UREA-FORMALDEHYDE BINDERS FOR NON-WOVEN FIBER GLASS MATS

(71) Applicant: JOHNS MANVILLE, Denver, CO (US)

(72) Inventors: Guodong Zheng, Highlands Ranch, CO (US); Mingfu Zhang, Englewood, CO (US); Luke Weith, Littleton, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 990 days.

(21) Appl. No.: 16/542,423

(22) Filed: Aug. 16, 2019

(65) Prior Publication Data

US 2021/0047508 A1 Feb. 18, 2021

(51) Int. Cl.
| | |
|---|---|
| C08L 61/24 | (2006.01) |
| C08G 12/40 | (2006.01) |
| C08L 3/02 | (2006.01) |
| D04H 1/4218 | (2012.01) |
| D04H 1/52 | (2006.01) |

(52) U.S. Cl.
CPC .............. *C08L 61/24* (2013.01); *C08G 12/40* (2013.01); *C08L 3/02* (2013.01); *D04H 1/4218* (2013.01); *D04H 1/52* (2013.01)

(58) Field of Classification Search
CPC .................. C08L 61/24; C08L 3/02
See application file for complete search history.

(56) References Cited

U.S. PATENT DOCUMENTS

| | | | |
|---|---|---|---|
| 4,014,726 A | 3/1977 | Fargo | |
| 4,018,959 A * | 4/1977 | Demko | C08K 3/24 |
| | | | 428/182 |
| 4,255,495 A | 3/1981 | Levine et al. | |
| 4,942,191 A * | 7/1990 | Rogers | C09J 161/20 |
| | | | 524/25 |
| 4,992,519 A * | 2/1991 | Mukherjee | C08L 97/02 |
| | | | 428/326 |
| 6,281,298 B1 * | 8/2001 | Papsin, Jr. | B32B 27/00 |
| | | | 525/309 |
| 10,119,020 B2 | 11/2018 | Zheng et al. | |
| 2003/0155690 A1 * | 8/2003 | Kim | B27N 3/007 |
| | | | 264/331.19 |
| 2008/0083522 A1 | 4/2008 | Poggi et al. | |
| 2008/0160854 A1 * | 7/2008 | Nandi | C08L 61/24 |
| | | | 524/503 |
| 2013/0130582 A1 * | 5/2013 | Zheng | C08J 5/043 |
| | | | 442/180 |
| 2019/0048501 A1 * | 2/2019 | Lester | D04H 1/64 |

FOREIGN PATENT DOCUMENTS

| | | |
|---|---|---|
| GB | 0 907 302 A | 12/1958 |
| GB | 1 457 216 A | 12/1976 |
| WO | 2008/150647 A1 | 12/2008 |
| WO | 2011/019597 A1 | 2/2011 |

OTHER PUBLICATIONS

Zhu et al. (J. Appl. Polym. Sci. 2014, 40202, p. 1-6) (Year: 2014).*

* cited by examiner

*Primary Examiner* — Liam J Heincer
(74) *Attorney, Agent, or Firm* — Robert D. Touslee

(57) ABSTRACT

A method of forming a binder composition includes providing a urea-formaldehyde resin and combining one or more starch compounds with the urea-formaldehyde resin to form a starch modified urea-formaldehyde resin. The one or more starch compounds may be combined with the urea-formaldehyde resin so that the starch modified urea-formaldehyde resin includes about 1 wt. % to about 10 wt. % of the one or more starch compounds.

15 Claims, 2 Drawing Sheets

MODIFIED UREA-FORMALDEHYDE BINDERS FOR NON-WOVEN FIBER GLASS MATS

CROSS-REFERENCES TO RELATED APPLICATIONS

The present application is related to co-assigned U.S. Pat. No. 7,662,258 issued Feb. 16, 2010; U.S. Pat. No. 7,691,761 issued Apr. 6, 2010, and U.S. Pat. No. 10,119,020 issued Nov. 6, 2018. The entire contents of all aforementioned patents are herein incorporated by reference for all purposes.

BACKGROUND OF THE INVENTION

Thermoset urea-formaldehyde (UF) resins are commonly used as binders for fiber reinforced composites because of their suitability for various applications and their relatively low cost. However, fiber reinforced composites bonded with neat UF resin are often brittle and cause processing and product performance issues. In order to overcome these issues, it is common to modify UF resin with conventional latexes, such as polyvinyl acetate, vinyl acrylic, or styrene-butadiene latexes. Modifying UF resin with conventional latexes improves the flexibility of fiber reinforced composites which in turn improves the strength of fiber reinforced composites. Improved strength is needed to achieve high speed processing of fiber reinforced composites on commercial manufacturing lines as well as optimal product performance. However, these conventional latex modifiers are typically expensive and the modification of UF resins with conventional latexes increases binder cost significantly. In addition, conventional latexes are petroleum-based, and are thus derived from a non-renewable and non-sustainable resource. Therefore, there is a need to develop binder compositions that are more cost effective, more environmentally sustainable, and that do not degrade the strength of fiber reinforced composites.

BRIEF SUMMARY OF THE INVENTION

Binder compositions are described that include urea-formaldehyde (UF) resin and a starch modifier at concentration levels that strengthen the tensile and tear strength (among other properties) of composites formed with the binder compositions. The starch may replace at least a portion of the conventional, petroleum-based modifiers used in the binder compositions to create composites based on more sustainable and renewable materials than conventional composites.

There is widespread belief that starches would make inadequate substitutes for petroleum-based modifiers, especially in composites exposed to hot, humid conditions such as roofing materials. The present starch-containing binder compositions are shown to form composites with hot/wet tensile strength that is actually higher than comparable composites made exclusively with petroleum-based modifiers. Thus, the present binder compositions are not only made with environmentally advantageous materials, they also demonstrate performance characteristics that make them superior materials for challenging environments such as roofing materials in hot, humid climates.

Embodiments of the invention include binder compositions that include UF resins and starch used as a modifier/strengthener. The concentration of the starch may by about 1 wt. % to about 10 wt. % of the binder composition.

Embodiments of the invention also include fiber reinforced composites that include a polymer matrix formed from a binder composition having UF resin and about 1 wt. % to about 10 wt. % of a starch. The composites may further include organic and/or inorganic fibers.

Embodiments of the invention further include a method of forming a binder composition. The method may include providing a urea-formaldehyde resin and combining one or more starch compounds with the urea-formaldehyde resin to form a starch modified urea-formaldehyde resin. The one or more starch compounds may be combined with the urea-formaldehyde resin so that the starch modified urea-formaldehyde resin includes about 1 wt. % to about 10 wt. % of the one or more starch compounds.

Embodiments of the invention additionally include a method of forming a non-woven fiber mat. The method may include providing a binder composition, applying the binder composition to a wet laid fiber mesh, and drying the wet laid fiber mesh and binder composition to bond the fibers of the wet laid fiber mesh together and thereby form the non-woven fiber mat. The binder composition may include a urea-formaldehyde resin and about 1 wt. % to about 10 wt. % of a starch.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals may be used throughout the drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
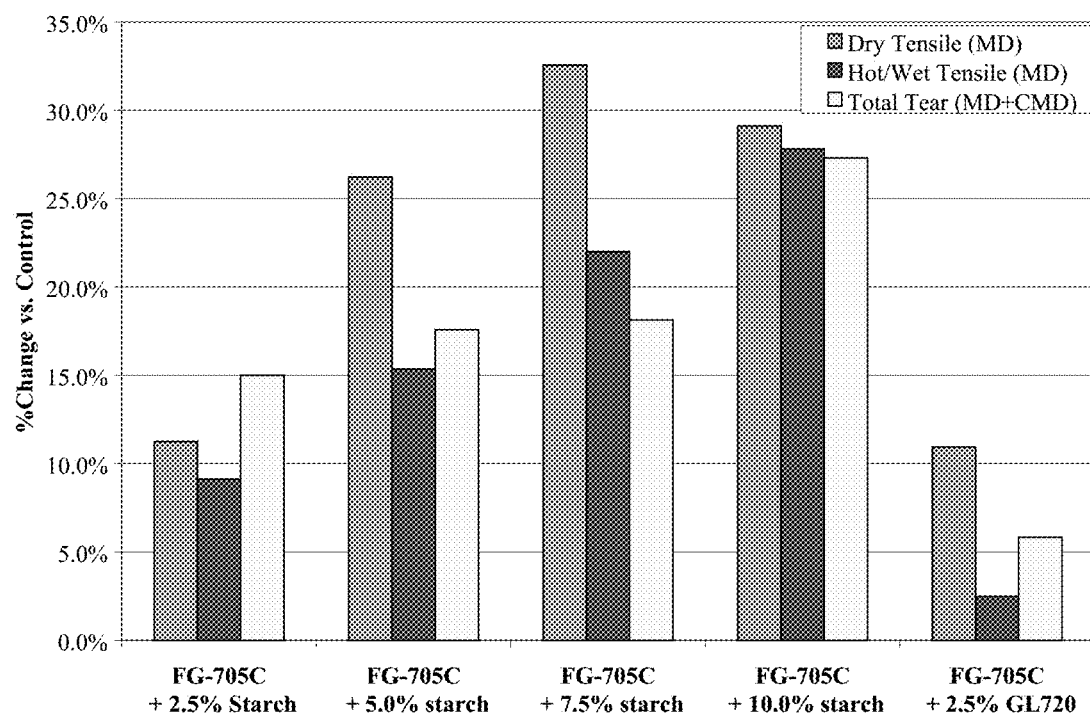
FIG. 1 is a graph of dry tensile in machine-direction (MD), hot/wet tensile (MD), and total tear strengths for fiber glass mat samples bonded with modified UF resins, expressed as a ratio to a standard UF resin.

Exemplary binder compositions and their use in fiber reinforced composites are described. These compositions may include combinations of conventional thermoset binders such as urea-formaldehyde (UF) and starches to at least partially replace more conventional, petroleum-based modifiers such as polyvinyl acetate, acrylic latexes, and/or styrene-butadiene latexes, among other modifiers. The fiber reinforced composites made from these binder compositions may have tensile and tear strength characteristics that exceed those made exclusively with petroleum-based modifiers.

Exemplary Binder Compositions

The present binder compositions may include a urea-formaldehyde based resin and one or more starch compounds with concentrations that promote the toughening and/or strengthening of a composite made from the binder. Exemplary starch concentration ranges may be from about 1 wt. % to about 10 wt. % of the binder composition. Additional exemplary starch concentration ranges may include about 1 wt. % to about 7.5 wt. %; about 1 wt. % to about 5 wt. %; 1 wt. % to about 4 wt. %; about 1 wt. % to about 3 wt. %; about 1 wt. % to about 2.5 wt. %; about 1 wt. % to about 2 wt. %; about 1 wt. % to about 1.5 wt. %. etc.

A ceiling for the starch concentration may be set such that the starch does not function as a significant thickener in the binder composition that substantially increases the viscosity of the composition. For example, the concentration of the starch may have an upper limit threshold of about 10 wt. % in embodiments where it is not desired for the starch to act as a thickener.

The starches used in the present binder compositions may include one or more native or modified starches. The native or modified starches may be derived from corn, potatoes, tapioca, or wheat among other sources. Exemplary modified starches may include cationic or anionic starches. One example of modified cationic starch is the RediBOND5330 starch produced by National Starch.

In some embodiments, the size of the starch compounds may be controlled to affect the thickness of the binder compositions. Exemplary weight average molecular weights may include a range of about 200,000 g/mol or less; about 190,000 g/mol or less; about 180,000 g/mol or less; about 170,000 g/mol or less; about 160,000 g/mol or less; or about 150,000 g/mol or less; etc. Further exemplary weight average molecular weights may include about 100,000 g/mol or less; about 90,000 g/mol or less; about 80,000 g/mol or less; about 70,000 g/mol or less; about 60,000 g/mol or less; about 50,000 g/mol or less; etc.

Higher weight average molecular weight ranges for the starches are also contemplated for embodiments of the present binder compositions. For example, the starch may have a weight average molecular weight range of about 100,000 to about 2,000,000 g/mole. Additional exemplary ranges include about 200,000 to about 1,000,000 g/mole.

The present binder compositions may alternatively include a urea-formaldehyde based resin, one or more starch compounds, and/or one or more petroleum-based modifiers. The petroleum-based modifiers may include polyvinyl acetate, acrylic latexes, and/or styrene-butadiene latexes, among other modifiers. The weight ratio of the starch to the petroleum-based plasticizer may be about 0.1:1 or more. Alternatively, the starch may replace about 10 wt. % of the petroleum-based plasticizer.

The thermosetting urea-formaldehyde (UF) resins used in the present binder compositions may be prepared from urea and formaldehyde monomers and UF precondensates. Suitable resin compositions include thermosetting UF resin compositions that can be used for making binder compositions for fiber mats. Any form of these resin compositions which can react with other reactants and not introduce extraneous moieties deleterious to the desired reaction and reaction product can be utilized. Exemplary thermosetting UF resins that may be used in preparing the present binder compositions are disclosed in U.S. Pat. No. 5,851,933, the disclosure of which is incorporated herein by reference for all purposes.

Formaldehyde for making the thermosetting UF resin is available in many forms. Examples include paraform (solid, polymerized formaldehyde) and formalin solutions (aqueous solutions of formaldehyde, sometimes with a small amount of methanol, in 37%, 44%, or 50% formaldehyde concentrations). Formaldehyde also is available as a gas.

Similarly, urea for thermosetting UF resins is available in many forms. Solid urea, such as prill, and urea solutions, typically aqueous solutions, may be used. Further, the urea may be combined with another moiety, such as formaldehyde and urea-formaldehyde adducts, which may be provided in aqueous solution.

A wide variety of procedures may be used for reacting the principal urea and formaldehyde components to form an aqueous thermosetting UF resin composition, such as staged monomer addition, staged catalyst addition, pH control, and amine modification among other procedures. The urea and formaldehyde may be reacted at a mole ratio of formaldehyde to urea in the range of about 1.1:1 to 4:1. For example, urea and formaldehyde may be reacted at an F:U mole ratio of between about 2.1:1 to 3.2:1. The U-F resin may also be highly water dilutable, if not water soluble.

Exemplary resin compositions may contain reactive methylol groups, which upon curing form methylene or ether linkages. Such methylol-containing adducts may include N,N'-dimethylol, dihydroxymethylolethylene; N,N'bis(methoxymethyl), N,N'-dimethylolpropylene; 5,5-dimethyl-N,N'dimethylolethylene; N,N'-dimethylolethylene; and the like.

Thermosetting UF resins useful in the practice of the invention may contain 45 to 75% by weight nonvolitiles, for example about 50 to 60% by weight nonvolitiles. These resins may also have an initial viscosity of about 50 to 600 cPs. For example, a thermosetting UF resin useful in the practice of the invention may have a viscosity of 150 to 400 cPs. Additionally, a thermosetting UF resin may exhibit a pH of 7.0 to 9.0 or alternatively 7.5 to 8.5. These resins may also have a free formaldehyde level of not more than about 3.0% (for example less than 1%) and a water dilutability of 1:1 to 100:1 (for example 5:1 and above).

A resin modifier such as ammonia, alkanolamines, or polyamines may be added to the reactants that are used to make the UF resin. Polyamines may include an alkyl primary diamine such as ethylenediamine (EDA). Additional modifiers, such as melamine, ethylene ureas, primary amines, secondary amines, and tertiary amines may also be incorporated into a UF resin. Concentrations of these modifiers in the reaction mixture often will vary from 0.05 to 15.0% by weight of the UF resin solids. These types of modifiers may promote hydrolysis resistance, polymer flexibility, and lower formaldehyde emissions in the cured resin. Further urea additions for purposes of scavenging formaldehyde or as a diluent may also be used. The present binder compositions may also contain a variety of additives such as silica colloid to enhance fire resistance, antifoamers, biocides, pigments, surfactants and the like.

The binder compositions may have a solids content of about 5 wt. % to about 70 wt. %. Exemplary solids contents for binder compositions that have not been diluted with water (e.g., resin compositions) may be greater than about 35 wt. %; greater than about 40 wt. %; greater than about 45 wt. %; greater than about 50 wt. %; etc. Exemplary solids content ranges may include about 5 wt. % to about 35 wt. % and about 45 wt. % to about 70 wt. %, among others. Exemplary solids contents for aqueous binder compositions may include about 35 wt. % or less; about 30 wt. % or less; about 25 wt. % or less; about 20 wt. % or less; about 15 wt. % or less; etc. Exemplary solids content ranges for aqueous binder compositions may include about 10 wt. % to about 30 wt. %, among others.

Exemplary Fiber Reinforced Composites

The present fiber reinforced composites may include a binder matrix made from the present binder compositions and organic and/or inorganic fibers. Organic fibers may include without limitation, acrylic, aromatic polyamides, polyesters, cellulosic fibers, and/or polyolefin fibers among others. Exemplary inorganic fibers may include mineral fibers, ceramic fibers, graphite fibers, metal fibers, metal coated glass or graphite fibers, and/or glass fibers among others. Various glass fibers may be suitable for use in this invention including E type, T type, C type, A type, and S type glass fibers. In one embodiment, a fiber reinforced composite may include a binder matrix made from the present binder compositions and glass fibers. In another embodiment, a fiber reinforced composite may include a binder matrix made from the present binder composition, glass fibers, and up to about 25 wt. % organic fibers.

Fibers used in the present fiber reinforced composites may independently have lengths of about ¼ inch to 5 inches (about 6 to about 140 mm) and diameters of about 3 to 25 microns. For example, glass fibers having diameters in the range of 3 to 25 microns may be used. Alternatively, glass fibers having diameters in the range of 12 to 17 microns may be used. The glass fibers may all have about the same target length, such as 0.75 inches, 1 inch, or 1.25 inches. However, fibers of different lengths and diameters can also be used to produce composites with different characteristics. Glass fibers used in a wet process for making fiber glass mats may be up to about 3 to 5 inches in length, and even longer fibers can be used in some processes. Generally the longer the fiber, the higher the tensile and strengths of the mat, but the poorer the fiber dispersion.

In addition (or in lieu of) the fibers, solid particles such as organic and/or inorganic flakes (e.g., carbon and/or glass flakes) may reinforce the composite. Other reinforcing solid particles may include ceramic particles, metal particles such as aluminum, and amorphous materials including polymers and carbon black among other particles.

The fiber reinforced composites may include fiber reinforced mats used for building materials, for example, as components of roofing shingles. The mats may be formed by contacting the binder compositions with a woven or non-woven mat of fibers (e.g., glass fibers) and curing the mixture to form the composite mat. The finished mat may contain about 55 wt. % to about 97 wt. % fibers, and about 3 wt. % to about 45 wt. % (e.g., about 15-30 wt. %) of the binder matrix (i.e., the cured binder).

The present fiber reinforced composites that include starch as a modifier/strengthener have comparable and in some cases enhanced strength characteristics compared with composites made exclusively with petroleum-based modifiers. For example, fiber reinforced composites that include starch have hot/wet tensile strengths that are about 5% to about 10% greater than fiber reinforced composites that include acrylic latex modifier. In another example, fiber reinforced composites that include starch have total tear strengths that are about 5% to about 10% greater than fiber reinforced composites that include acrylic latex modifer.

While not wishing to be bound by any particular scientific theory, it is believed that starch and UF resin crosslink with each other via reaction between hydroxyl functionalities on starch molecules and reactive functionalities on UF resin, and this crosslinking strengthens fiber glass composites. Latex modifiers are often non-reactive or less reactive toward UF resin, and thus there is minimal or no crosslinking between the UF resin and the latex modifier. The substantial increase in hot/wet tensile and tear strength for a UF resin modified with starch, as compared to a UF resin modified with latex (see FIG. 1), indicates that crosslinking occurs between UF resin and starch.

The present fiber reinforced composites that include starch as a modifier/strengthener also have enhanced strength characteristics compared with composites made without modifiers/strengtheners. For example, fiber reinforced composites that include starch have tensile strengths that are about 5% to about 40% greater than fiber reinforced composites made with unmodified UF resin. In another example, fiber reinforced composites that include starch have hot/wet tensile strengths that are about 5% to about 35% greater than fiber reinforced composites made with unmodified UF resin. In an alternate example, fiber reinforced composites that include starch have total tear strengths that are about 10% to about 35% greater than fiber reinforced composites made with unmodified UF resin.

EXPERIMENTAL

As noted above, the fiber reinforced composites made from the present binder compositions show improved dry tensile, hot/wet tensile, and tear strengths as compared to corresponding binder compositions without starch. Table 1 shows the results of dry tensile, hot/wet tensile, and tear tests for non-woven fiber glass mat samples bonded with various UF resins. The UF resins evaluated included (1) a FG-705C UF resin from Hexion (standard resin), (2) a FG-705C UF resin from Hexion modified with 2.5%, 5%, 7.5%, and 10 wt. % RediBOND5330 starch, and (3) a FG-705C UF resin from Hexion modified with 2.5 wt. % GL720 acrylic latex from Rohm & Haas.

Dry tensile and hot/wet tensile strengths for fiber glass mats bonded with UF resins were measured in the machine direction (MD) at room temperature. Tear strengths for fiber glass mats bonded with UF resins were measured in both the machine direction and cross machine direction (CMD) at room temperature using a standard Instron.

TABLE 1

Physical Properties of UF Resins

| Binder | LOI | Dry Tensile (MD) | | Hot/Wet Tensile (MD) | | Hot/Wet Retention | Tear (MD + CMD) | |
|---|---|---|---|---|---|---|---|---|
| | | Mean | STDev | Mean | STDev | | Mean | STDev |
| FG-705C (Standard) | 19.3% | 34.7 | 6.4 | 24.1 | 6.2 | 69.5% | 914.3 | 100.8 |
| FG-705C + 2.5% Starch | 18.9% | 38.6 | 4.5 | 26.3 | 4.1 | 68.1% | 1051.5 | 137.1 |
| FG-705C + 5% Starch | 18.9% | 43.8 | 7.3 | 27.8 | 5.2 | 63.5% | 1075.1 | 154.2 |

TABLE 1-continued

Physical Properties of UF Resins

| Binder | LOI | Dry Tensile (MD) | | Hot/Wet Tensile (MD) | | Hot/Wet Retention | Tear (MD + CMD) | |
|---|---|---|---|---|---|---|---|---|
| | | Mean | STDev | Mean | STDev | | Mean | STDev |
| FG-705C + 7.5% Starch | 19.0% | 46.0 | 9.8 | 29.4 | 3.6 | 63.9% | 1080.0 | 113.7 |
| FG-705C + 10% Starch | 19.1% | 44.8 | 11 | 30.8 | 1.9 | 68.8% | 1163.9 | 100.0 |
| FG-705C + 2.5% GL720 | 19.1% | 38.5 | 6.4 | 24.7 | 3.0 | 64.2% | 967.7 | 107.8 |

FIG. 1 shows the improvements in dry tensile, hot/wet tensile, and tear strength exhibited by starch modified UF resins and an acrylic latex modified UF resin over a standard UF resin. Substantial increases in dry tensile, hot/wet tensile and tear strength are obtained when starch is added to a standard UF resin. FIG. 1 also shows that comparable dry tensile strengths are exhibited by composites made with 2.5 wt. % latex modified UF resin and 2.5 wt. % starch modified UF resin. Both exhibit about an 11% increase in dry tensile strength over a standard UF binder. Additionally, FIG. 1 shows that a 2.5 wt. % starch modified UF resin exhibits improved hot/wet tensile and tear strength as compared to a 2.5 wt. % acrylic latex-modified UF resin, about 6.6% and 9.1% respectively.

Table 2 lists viscosities of various binder compositions at 16% solids. The data shows that the standard binder, the starch modified binder, and the latex modified binder all exhibit comparable viscosities.

TABLE 2

Viscosities of UF Resins

| Binder | Viscosity @ 16% Solids (cPs) |
|---|---|
| FG-705C (standard) | 5.44 |
| FG-705C + 1% Starch | 5.53 |
| FG-705C + 2.5% Starch | 5.53 |
| FG-705C + 2.5% GL720 | 5.06 |

Urea-formaldehyde resin is formed by chemically combining urea, which is a solid crystal obtained from ammonia, and formaldehyde, which is typically a highly reactive gas that is obtained from methane. Urea-formaldehyde (UF) resins are commonly synthesized or formed via condensation polymerization from an aqueous solution of formaldehyde and urea. Ammonia may be used as an alkaline catalyst or the reaction may occur under relatively neutral conditions. The condensation polymerization reaction results in a viscous UF resin that can be applied as an adhesive for various applications. A common application involving UF resin is coating non-woven fiber mats, which are commonly made of glass fibers or other organic or inorganic fibers. In regards to non-woven fiber mats, the UF resin is typically coated atop a web or mesh of loose fibers. The coated fiber mat is then passed through an oven where heat is used to cure the UF resin to form the non-woven fiber mat. Prior to curing, the UF resin is composed mainly of low-molecular-weight intermediate polymers or prepolymers, whereas curing results in the formation of a network of crosslinked polymers.

As described herein, a starch modifier may be combined with the UF resin to modify the UF resin. The starch modifier may include one or more starch compounds as described herein. The modified UF resin may be particularly useful for applications that involve non-woven mats as described herein. Several methods of forming a modified UF composition are described herein. For example, in some embodiments the starch may be added prior to or during the synthesis of UF resin. In such embodiments, the starch modification of the UF resin may be largely chemically based, which means that the starch chemically bonds with the UF resin. The chemical bonding between starch and UF resin may increase homogeneity of the starch modified UF resin. In other embodiments, the starch may be added to the UF resin at the later stages of synthesis, or even after synthesis, of the UF resin. In such embodiments, the starch modification of the UF resin may be largely physical blending of starch with UF resin.

The modified UF resin may promote toughening and/or strengthening of a product made from the thermoset UF binder. Exemplary starch concentration ranges in the starch modified UF resin may be from about 1 wt. % to about 10 wt. % of the binder composition. Additional exemplary starch concentration ranges may include about 1 wt. % to about 7.5 wt. %; about 1 wt. % to about 5 wt. %; 1 wt. % to about 4 wt. %; about 1 wt. % to about 3 wt. %; about 1 wt. % to about 2.5 wt. %; about 1 wt. % to about 2 wt. %; about 1 wt. % to about 1.5 wt. %. etc. In a specific embodiment, the starch concentration may be less than 5 wt. %, such as about 1 wt. %.

One method of forming a starch modified UF resin involves dissolving one or more starch compounds in water to form a starch solution. The starch solution may then be combined with formaldehyde and urea prior to or during the synthesis of UF resin. Alternatively, the starch solution may be added to the synthesized UF resin. For example, in one embodiment the condensation polymerization process may be initiated and then the starch solution may be added to the aqueous solution of formaldehyde and urea. In another embodiment, the formaldehyde and urea may be added to the starch solution so that the water in the starch solution functions as the aqueous environment for the formaldehyde and urea. The aqueous solution of starch, formaldehyde, and urea may then be reacted to form the starch modified UF resin. In such embodiments, the starch may be chemically bonded with the UF resin during the condensation polymerization process. The starch solution may be blended in the UF resin in a specific ratio. The introduction of the starch solution prior to or during UF resin synthesis may result in a greater degree of bonding of the starch and UF resin.

In some instances, starch granules may be added to the aqueous solution of formaldehyde and urea prior to heating the solution to form or synthesize the UF resin. In such instances, the starch granules dissolve within the aqueous solution of formaldehyde and urea as the mixture is heated.

Another method of forming a starch modified UF resin involves adding a starch slurry to the heated aqueous solution of formaldehyde and urea prior to or during the synthesis of the UF resin. Different from a starch solution, which typically has high viscosity, starch slurry has relatively low viscosity. Therefore, a starch slurry can be easily mixed with the aqueous solution of formaldehyde and urea without significant increase in viscosity. The elevated temperature that is needed for the synthesis of UF resin helps the dissolution of starch granules in water during the synthesis of UF resin.

Another method of forming a starch modified UF resin involves adding a starch slurry to the heated UF resin at the completion of the UF resin synthesis process, before the UF resin is cooled down. The starch granules in the slurry may be dissolved in the heated UF resin and the mixture may be cooled to room temperature after the starch dissolves.

Regardless of the method that is employed, the starch modified UF resin may be applied to a material to provide one or more desired characteristics. For example, the starch modified UF resin may be added to a non-woven fiber mat to toughen and/or strengthen the non-woven fiber mat. The starch modified UF resin may be applied to the non-woven fiber mat in various amounts including any amount described herein. The starch modified UF resin may then be cured to crosslink the polymers and thereby bond the fibrous material together, such as bonding the fibers of the non-woven fiber mat together.

Figure 2:
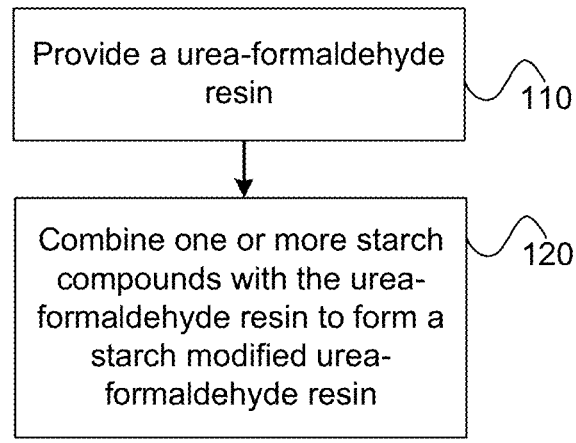
FIG. 2 illustrates a method of forming a binder composition.

Referring to FIG. 2, illustrated is a method of forming a binder composition. At block 110, a urea-formaldehyde resin is provided. At block 120, one or more starch compounds are combined with the urea-formaldehyde resin to form a starch modified urea-formaldehyde resin. The one or more starch compounds may be combined with the urea-formaldehyde resin so that the starch modified urea-formaldehyde resin includes about 1 wt. % to about 10 wt. % of the one or more starch compounds. In other embodiments, the one or more starch compounds may be combined with the urea-formaldehyde resin so that the starch modified urea-formaldehyde resin includes any of the starch ranges described herein, such as about 1 wt. % to about 7.5 wt. %; about 1 wt. % to about 5 wt. %; 1 wt. % to about 4 wt. %; about 1 wt. % to about 3 wt. %; about 1 wt. % to about 2.5 wt. %; about 1 wt. % to about 2 wt. %; or about 1 wt. % to about 1.5 wt. %.

In some embodiments, combining the one or more starch compounds with the urea-formaldehyde resin includes combining a starch solution with formaldehyde and urea. In such embodiments, water in the starch solution may provide the aqueous environment for formaldehyde and urea. In such embodiments, the method may also include synthesizing the urea-formaldehyde resin via condensation polymerization of the aqueous solution of starch, formaldehyde, and urea.

In other embodiments, providing the urea-formaldehyde resin includes providing an aqueous solution of formaldehyde and urea and initiating synthesis of the urea-formaldehyde resin. In such embodiments, the one or more starch compounds may be combined with the urea-formaldehyde resin by adding a starch slurry to the aqueous solution of formaldehyde and urea during synthesis of the urea-formaldehyde resin.

In yet other embodiments, providing the urea-formaldehyde resin includes heating a formaldehyde and urea solution to at or near a boiling temperature of the formaldehyde and urea solution to initiate synthesis of the urea-formaldehyde resin. In such embodiments, the one or more starch compounds may be combined with the urea-formaldehyde resin by adding a starch slurry to the hot urea-formaldehyde resin. In such embodiments, the method may also include dissolving the one or more starch compounds within the heated urea-formaldehyde resin, prior to the cooling of the starch modified urea-formaldehyde resin to an ambient temperature.

In yet other embodiments, providing the urea-formaldehyde resin includes providing a fully synthesized urea-formaldehyde resin that is composed mainly of low-molecular-weight intermediate polymers or prepolymers. In such embodiments, the one or more starch compounds may be combined with the urea-formaldehyde resin by adding a starch solution to the fully synthesized urea-formaldehyde resin.

The method may further include applying the starch modified urea-formaldehyde resin to a non-woven fiber mat and curing the starch modified urea-formaldehyde resin. The urea-formaldehyde resin and the one or more starch compounds may crosslink to increase a hot/wet aged tensile strength of the non-woven fiber mat by 5% to 35% compared to a comparative non-woven fiber mat made with an unmodified urea-formaldehyde binder composition that lacks the starch.

In some embodiments, the binder composition has a solids content of about 5 to 35 wt. %. The one or more starch compounds may be selected from the group consisting of a native starch, a cationically modified starch, and an anionically modified starch. Hydroxyl functional groups on the one or more starch compounds may bond to reactive functional groups on the urea-formaldehyde resin and the binder composition may lacks a styrene-containing, petroleum-based modifier. In other embodiments, the binder composition may have a solids content of greater than 35 wt. %, and in some embodiments may have a solids content of between about 45 wt. % to about 70 wt. %.

Figure 3:
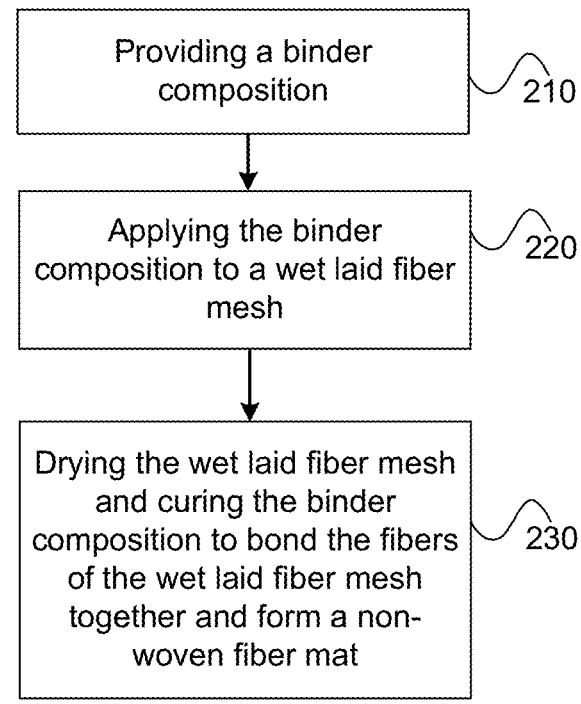
FIG. 3 illustrates a method of forming a non-woven fiber mat.

Referring to FIG. 3, illustrated is a method of forming a non-woven fiber mat. At block 210, a binder composition is provided. The binder composition includes a urea-formaldehyde resin and about 1 wt. % to about 10 wt. % of a starch. At block 220, the binder composition is applied to a wet laid fiber mesh. At block 230, the wet laid fiber mesh is dried and the binder composition is cured to bond the fibers of the wet laid fiber mesh together and thereby form the non-woven fiber mat. In some embodiments, the wet laid fiber mesh includes or consists of glass fibers.

In some embodiments, providing the binder composition includes combining a starch solution with formaldehyde and urea and reacting the starch with formaldehyde and urea to form a starch modified urea-formaldehyde resin. The water in the starch solution may provide an aqueous environment for the formaldehyde and urea. In such embodiments, synthesizing the starch modified UF resin includes or consists of condensation polymerization of the starch, formaldehyde, and urea.

In other embodiments, providing the binder composition includes providing an aqueous solution of formaldehyde and urea, initiating synthesis of the urea-formaldehyde resin, and combining a starch slurry with the aqueous solution of formaldehyde and urea during synthesis of the urea-formaldehyde resin. In yet other embodiments, providing the binder composition includes heating a formaldehyde and urea solution to at or near a boiling temperature of the formaldehyde and urea solution to initiate synthesis of the urea-formaldehyde resin, combining a starch slurry with the urea-formaldehyde resin, dissolving the starch within the heated urea-formaldehyde resin, and cooling the starch modified urea-formaldehyde resin to an ambient temperature. In yet other embodiments, providing the binder composition includes providing a fully synthesized urea-formaldehyde resin that is composed mainly of low-molecular-weight intermediate polymers or prepolymers and combining a starch solution to the fully synthesized urea-formaldehyde resin.

In some embodiments, the starch may be selected from the group consisting of a native starch, a cationically modified starch, and an anionically modified starch. Hydroxyl functional groups on the starch may bond to reactive functional groups on the urea-formaldehyde resin and/or the binder composition may lack a styrene-containing, petroleum-based modifier.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the starch" includes reference to one or more starches and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of forming a binder composition comprising:
providing an aqueous solution of formaldehyde and urea;
initiating synthesis of a urea-formaldehyde resin from the aqueous solution of formaldehyde and urea; and
combining one or more starch compounds with the urea-formaldehyde resin by adding a starch slurry to the aqueous solution of formaldehyde and urea during synthesis of the urea-formaldehyde resin to form a starch modified urea-formaldehyde resin;
wherein the one or more starch compounds are combined with the urea-formaldehyde resin so that the starch modified urea-formaldehyde resin includes about 1 wt. % to about 10 wt. % of the one or more starch compounds; and
wherein the one or more starch compounds have a weight average molecular weight of between about 100,000 g/mol to about 2,000,000 g/mol.

2. The method of claim 1, wherein water in the starch slurry provides an aqueous environment for the formaldehyde and urea; and wherein the method further comprises synthesizing the urea-formaldehyde resin via condensation polymerization of the aqueous solution of starch, formaldehyde, and urea.

3. The method of claim 1, further comprising:
heating the aqueous solution of formaldehyde and urea to at or near a boiling temperature of the aqueous solution to initiate synthesis of the urea-formaldehyde resin;
dissolving the one or more starch compounds within the urea-formaldehyde resin; and
cooling the starch modified urea-formaldehyde resin to an ambient temperature.

4. The method of claim 1, further comprising:
applying the starch modified urea-formaldehyde resin to a non-woven fiber mat; and
curing the starch modified urea-formaldehyde resin.

5. The method of claim 4, wherein the urea-formaldehyde resin and the one or more starch compounds crosslink to increase a hot/wet aged tensile strength of the non-woven fiber mat by 5% to 35% compared to a comparative non-woven fiber mat made with an unmodified urea-formaldehyde binder composition that lacks the starch.

6. The method of claim 1, wherein the binder composition has a solids content of about 5 to 35 wt. %.

7. The method of claim 1, wherein:
the one or more starch compounds is selected from the group consisting of a native starch, a cationically modified starch, and an anionically modified starch;
hydroxyl functional groups on the one or more starch compounds bond to reactive functional groups on the urea-formaldehyde resin; and
the binder composition lacks a styrene-containing, petroleum-based modifier.

8. The method of claim 1, wherein the binder composition comprises about 1 wt. % to about 2.5 wt. % of the one or more starch compounds.

9. The method of claim 8, wherein the binder composition has a solids content of greater than 35 wt. %.

10. A method of forming a non-woven fiber mat comprising:
providing a binder composition that includes a urea-formaldehyde resin and about 1 wt. % to about 10 wt. % of a starch, wherein providing the binder composition comprises:
providing an aqueous solution of formaldehyde and urea;
initiating synthesis of the urea-formaldehyde resin; and
combining a starch slurry with the aqueous solution of formaldehyde and urea during synthesis of the urea-formaldehyde resin, the starch slurry comprising one or more starch compounds having a weight average molecular weight of between about 100,000 g/mol to about 2,000,000 g/mol;
applying the binder composition to a wet laid fiber mesh;
drying the wet laid fiber mesh; and
curing the binder composition to bond fibers of the wet laid fiber mesh and thereby form the non-woven fiber mat.

11. The method of claim 10, wherein the wet laid fiber mesh comprises or consists of glass fibers.

12. The method of claim 10, wherein providing the binder composition further comprises reacting the starch with formaldehyde and urea to form a starch modified urea-formaldehyde resin.

13. The method of claim 12, wherein water in the starch slurry provides an aqueous environment for the formaldehyde and urea; and wherein reacting the starch with formaldehyde and urea comprises condensation polymerization of the starch, formaldehyde, and urea.

14. The method of claim 10, wherein providing the binder composition further comprises:
    heating the aqueous solution of formaldehyde and urea to at or near a boiling temperature of the aqueous solution to initiate synthesis of the urea-formaldehyde resin;
    dissolving the starch within the heated urea-formaldehyde resin; and
    cooling the starch modified urea-formaldehyde resin to an ambient temperature.

15. The method of claim 10, wherein:
    the starch is selected from the group consisting of a native starch, a cationically modified starch, and an anionically modified starch;
    hydroxyl functional groups on the starch bond to reactive functional groups on the urea-formaldehyde resin; and
    the binder composition lacks a styrene-containing, petroleum-based modifier.

\* \* \* \* \*